(12) United States Patent
Iwazume et al.

(10) Patent No.: US 9,920,720 B2
(45) Date of Patent: Mar. 20, 2018

(54) BLOWBY GAS TREATMENT DEVICE, INTAKE MANIFOLD AND INTERNAL COMBUSTION ENGINE

(71) Applicants: TOYOTA JIDOSHA KABUSHIKI KAISHA, Toyota-shi (JP); AISIN SEIKI KABUSHIKI KAISHA, Kariya-shi (JP)

(72) Inventors: Yukio Iwazume, Nagoya (JP); Hideto Yano, Toyota (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 56 days.

(21) Appl. No.: 15/040,626

(22) Filed: Feb. 10, 2016

(65) Prior Publication Data

US 2016/0237962 A1    Aug. 18, 2016

(30) Foreign Application Priority Data

Feb. 13, 2015   (JP) ................................. 2015-026557

(51) Int. Cl.
| | | |
|---|---|---|
| *F01M 13/00* | (2006.01) | |
| *F02M 35/10* | (2006.01) | |
| *F02M 35/104* | (2006.01) | |
| *F01M 11/10* | (2006.01) | |
| *F01M 13/02* | (2006.01) | |
| *F02M 25/06* | (2016.01) | |

(52) U.S. Cl.
CPC ...... *F02M 35/10222* (2013.01); *F01M 11/10* (2013.01); *F01M 13/0011* (2013.01); *F01M 13/021* (2013.01); *F02M 25/06* (2013.01); *F02M 35/104* (2013.01); *F02M 35/10255* (2013.01); *Y02T 10/121* (2013.01)

(58) Field of Classification Search
CPC ............. F02M 35/10222; F02M 35/16; F02M 35/104; F02M 35/10255; F01M 13/021; F01M 11/10
USPC ........................ 123/572–574, 184.21–184.61
See application file for complete search history.

(56) References Cited

U.S. PATENT DOCUMENTS

2003/0010321 A1* 1/2003 Rentschler ........... F01M 13/022
                                                        123/472
2005/0076892 A1* 4/2005 Nakamura ....... F02M 35/10111
                                                        123/572

(Continued)

FOREIGN PATENT DOCUMENTS

CN      204113381 U    1/2015
JP      2013-151872    8/2013

*Primary Examiner* — Marguerite McMahon
(74) *Attorney, Agent, or Firm* — Oblon, McClelland, Maier & Neustadt, L.L.P.

(57) ABSTRACT

A blowby gas treatment device is configured to discharge blowby gas inside an internal combustion engine to an intake passage inside an intake manifold. The blowby gas treatment device includes a blowby gas passage, a flow control valve, a communication hole, and a lid. The blowby gas passage includes an engine gas passage and an intake manifold gas passage. The communication hole is provided in the intake manifold. The communication hole is configured to connect outside of the intake manifold and a part of the intake manifold gas passage on a downstream side of the flow control valve in a gas flow direction. The communication hole opens the intake manifold gas passage to the atmosphere. A lid is configured to open and close the communication hole.

4 Claims, 7 Drawing Sheets (56) References Cited

U.S. PATENT DOCUMENTS

| | | | |
|---|---|---|---|
| 2006/0191505 A1* | 8/2006 | Doko | F02M 35/10039 123/184.59 |
| 2008/0308058 A1* | 12/2008 | Lewis | F01M 13/02 123/184.47 |
| 2009/0223497 A1* | 9/2009 | Tanaka | F02M 25/06 123/573 |
| 2013/0061825 A1* | 3/2013 | Borghi | F02M 35/10222 123/184.21 |
| 2013/0125851 A1* | 5/2013 | Miyashita | F02M 35/104 123/184.21 |
| 2015/0020781 A1* | 1/2015 | Keating | F02M 35/10222 123/568.11 |
| 2015/0292905 A1* | 10/2015 | Hikiji | F02M 35/104 73/114.31 |

* cited by examiner

FIG. 11

BLOWBY GAS TREATMENT DEVICE, INTAKE MANIFOLD AND INTERNAL COMBUSTION ENGINE

INCORPORATION BY REFERENCE

The disclosure of Japanese Patent Application No. 2015-026557 filed on Feb. 13, 2015 including the specification, drawings and abstract is incorporated herein by reference in its entirety.

BACKGROUND

1. Technical Field

The disclosure relates to a blowby gas treatment device that discharges blowby gas to an intake passage from inside an internal combustion engine, an intake manifold provided in an internal combustion engine, and an internal combustion engine.

2. Description of Related Art

A blowby gas treatment device is provided with an engine gas passage and an intake manifold gas passage, which serve as a passage in which blowby gas passes and are referred to as a blowby gas passage herein below. The engine gas passage is formed integrally with an internal combustion engine, for example, a cylinder head. The intake manifold gas passage is formed integrally with an intake manifold. Inside of the internal combustion engine and an intake passage formed inside the intake manifold are made to communicate with each other by the blowby gas passage. Then, blowby gas is discharged to the intake passage. The blowby gas passage is provided with a flow control valve for controlling an amount of blowby gas discharged to the intake passage through the blowby gas passage.

Japanese Patent Application Publication No. 2013-151872 discloses a passage serving as the blowby gas passage that extends inside an internal combustion engine and allows inside of a cylinder head and inside of a crankcase to communicate with each other.

The blowby gas treatment device monitors pressure in a part of the blowby gas passage on a downstream side of the flow control valve in a gas flow direction. This makes it possible to perform an operation check of the blowby gas treatment device. The operation check is performed, for example, as described below.

In the blowby gas treatment device, the part of the blowby gas passage on the downstream side in the gas flow direction is connected with the intake passage. As the flow control valve, a valve is frequently used, which opens when pressure in the downstream part becomes lower than pressure in a part of the blowby gas passage on an upstream side in the gas flow direction, which is referred to as an upstream part herein below. This means that many of these flow control valves open and close in accordance with a pressure difference between the downstream part and the upstream part. In the blowby gas treatment device, in which such a flow control valve is used, gas inside the downstream part of the blowby gas passage is sucked, and internal pressure of the downstream part is monitored. It is thus possible to perform operation check of the blowby gas treatment device.

Due to the suction of gas, internal pressure of the downstream part of the blowby gas passage is reduced, and the flow control valve opens properly. Then, pressure inside the engine is introduced into the downstream part from the upstream part. Therefore, pressure in the downstream part does not become so low. On the contrary, when the flow control valve remains closed and does not open even though internal pressure of the downstream part of the blowby gas passage is reduced by the suction of gas, pressure inside the engine is not introduced into the downstream part. Therefore, pressure in the downstream part is reduced greatly. By monitoring internal pressure of the downstream part of the blowby gas passage, it is possible to perform operation check of the blowby gas treatment device, namely, the flow control valve.

When performing this kind of operation check of a blowby gas treatment device having a structure in which an engine gas passage and an intake manifold gas passage are connected with each other through a hose, it is possible to disconnect the hose and connect the hose with operation check equipment. This means that it is possible to monitor pressure inside the blowby gas passage by a simple procedure.

SUMMARY

However, when a blowby gas passage is formed integrally with an internal combustion engine and an intake manifold, it is not possible to employ a procedure for disconnecting a part of the blowby gas passage and connecting the part of the blowby gas passage with operation check equipment. Therefore, it becomes difficult to monitor internal pressure of the blowby gas passage and perform operation check of the blowby gas treatment device. As an example in which a blowby gas passage is formed integrally with an internal combustion engine and an intake manifold, there is a blowby gas passage described in JP 2013-151872 A.

A blowby gas treatment device and an intake manifold are provided, in which operation check of a blowby gas treatment device is performed easily even though a blowby gas passage is formed integrally with the internal combustion engine and the intake manifold.

According to the embodiments, a blowby gas treatment device discharges blowby gas inside an internal combustion engine to an intake passage inside an intake manifold. This device includes an engine gas passage, an intake manifold gas passage, and a blowby gas passage. The engine gas passage is formed in the internal combustion engine, and the intake manifold gas passage is formed in the intake manifold. The blowby gas passage allows inside of the internal combustion engine and the intake passage to communicate with each other. Blowby gas passes through the blowby gas passage. This device also includes a flow control valve and a communication hole. The flow control valve is provided in the blowby gas passage, and controls an amount of blowby gas passing through the blowby gas passage. The communication hole is provided in the intake manifold. Because of the communication hole, a part on a downstream side of the flow control valve in a gas flow direction communicates with outside of the intake manifold. This means that the communication hole allows the intake manifold gas passage to be opened to the atmosphere. Further, this device includes a lid provided so as to open and close the communication hole.

As the communication hole, which allows inside of the blowby gas passage and outside of the intake manifold to communicate with each other, is provided in the intake manifold, it is possible to perform operation check of the blowby gas treatment device by using the communication hole. However, simply providing the communication hole causes a part of the blowby gas passage on the downstream side of the flow control valve in the gas flow direction to be opened to the atmosphere through the communication hole when the internal combustion engine is operated. Therefore, gas inside the blowby gas passage is released into the atmosphere, and the atmosphere flows into the blowby gas passage, thereby causing improper operation of the blowby gas treatment device. In this regard, with the above-mentioned device, since a lid is provided, which is able to open and close the communication hole, the blowby gas passage is not opened to the atmosphere by closing the communication hole with the lid while the internal combustion engine is operating. Therefore, the blowby gas treatment device functions properly. Moreover, when performing operation check of the blowby gas treatment device, by opening the lid, the part of the blowby gas passage on the downstream side of the flow control valve in the gas flow direction is opened to outside of the intake manifold through the communication hole. By connecting the operation check equipment to the communication hole, it is possible to monitor internal pressure of the blowby gas passage easily. Therefore, according to the above-mentioned device, even though the blowby gas passage is formed integrally with the internal combustion engine and the intake manifold, it is possible to perform operation check of the blowby gas treatment device easily.

According to the embodiments, the lid may include a first side, a first through hole, and a slit. The slit may include a second through hole, and the first side may be one of long sides of the lid. The first through hole and the second through hole may be provided at a given distance from each other, and the slit may extend to the first side from the second through hole. The slit may extend to an intersection point at which a raceway of a circumference of a circle and the first side intersect with each other. The circle may have a radius which is defined by a distance from the first through hole to the second through hole. The lid may be configured to be fastened to the intake manifold by a first external thread inserted into the first through hole and a second external thread inserted into the second through hole when closing the communication hole.

According to the above device, by screw fastening using the first through hole and the second through hole provided in the lid, and the first external thread and the second external thread inserted into the first through hole and the second through hole, respectively, it is possible to fasten and fix the lid to the intake manifold in a state where the communication hole is closed. In addition, the slit extending from the second through hole that serves as a starting point is formed in the lid, thereby making it possible to turn the lid about the first through hole without making the lid hit the second external thread. Therefore, by loosening screws at two screw fastening parts, it is possible to turn the lid about the first through hole without removing the lid. Thus, it is possible to open the communication hole to outside by shifting the lid from the position where the communication hole of the intake manifold is closed. As stated above, according to the above-mentioned device, it is possible to use the lid to close the communication hole or open the communication hole to outside the intake manifold without removing the lid from the intake manifold.

According to the embodiments, the flow control valve may be configured such that opening of the flow control valve changes in accordance with a pressure difference in the engine gas passage and in the intake passage at normal time of the flow control valve.

In the above device, when there is a pressure difference between the upstream side of the flow control valve in the gas flow direction, and the downstream side in the gas flow direction, pressure in the part of the blowby gas passage on the downstream side of the flow control valve in the gas flow direction changes depending on the opening/closing state of the flow control valve. Therefore, it is possible to determine whether or not the flow control valve operates normally by monitoring pressure in the downstream part when the flow control valve opens at normal time, and by monitoring pressure in the downstream part when the flow control valve closes at normal time.

According to the embodiments, an intake passage configured to allow fluid to pass through towards an intake port of an internal combustion engine is provided. A blowby gas passage is configured to allow blowby gas to pass through. A flow rate of the blowby gas is controlled by a flow control valve. The blowby gas passage includes an engine gas passage and an intake manifold gas passage. The engine gas passage is formed integrally with the internal combustion engine. A communication hole connects a part of the intake manifold gas passage to outside. The part of the intake manifold gas passage is on a downstream side of the flow control valve in a gas flow direction. The communication hole opens the intake manifold gas passage to the atmosphere, and a lid is configured to open and close the communication hole.

By providing the communication hole that allows inside of the intake manifold gas passage and outside of the intake manifold communicate with each other, it is possible to perform operation check of the blowby gas treatment device by using the communication hole. However, by simply providing the communication hole, the part of the intake manifold gas passage on the downstream side of the flow control valve in the gas flow direction is opened to the atmosphere through the communication hole when the internal combustion engine is operating, and the gas inside the intake manifold gas passage is released into the atmosphere, and the atmosphere is flown into the intake manifold gas passage. In this regard, in the above-mentioned intake manifold, since the lid is provided, which is able to open and close the communication hole, the intake manifold gas passage is not opened to the atmosphere by closing the communication hole by using the lid while the internal combustion engine is operating. Moreover, when performing operation check of the blowby gas treatment device, by opening the lid, the part of the intake manifold gas passage on the downstream side of the flow control valve in the gas flow direction is opened to outside of the intake manifold through the communication hole. By connecting operation check equipment to the communication hole, it is possible to monitor internal pressure of the blowby gas passage easily. Therefore, according to the above-mentioned intake manifold, even though the blowby gas passage is formed integrally, it is possible to perform operation check of the blowby gas treatment device easily.

According to the embodiments, the lid may include a first through hole, a slit, and a first side. The slit may include a second through hole. The first through hole and the second through hole may be provided at a distance from each other. The slit may extend to the first side from the second through hole, and to an intersection point at which a raceway of a circumference of a circle and the first side intersect with each other. The circle may have a radius which is defined by a distance from the first through hole to the second through hole. The lid may be configured to be fastened to the intake manifold by a first external thread inserted into the first through hole and a second external thread inserted into the second through hole when closing the communication hole.

According to the intake manifold, by screw fastening by using the first through hole and the second through hole provided in the lid, and the first external thread and the second external thread inserted through the through holes, respectively, it is possible to fasten and fix the lid to the intake manifold in a state where the communication is closed. In addition, the slit extending from the second through hole that serves as a starting point is formed in the lid, thereby making it possible to turn the lid about the first through hole without making the lid hit the second external thread. Therefore, by loosening screws at two screw fastening parts, it is possible to turn the lid about the first through hole without removing the lid. Thus, it is possible to open the communication hole to outside of the intake manifold by shifting the lid from the position where the communication hole is closed. As stated above, according to the intake manifold, it is possible to use the lid to close the communication hole or open the communication hole to outside the intake manifold without removing the lid.

According to the embodiments, an internal combustion engine is provided. The internal combustion engine includes an intake manifold, an engine gas passage, a flow control valve, and a lid. The intake manifold includes an intake passage, intake manifold gas passage, and a communication hole. The engine gas passage is provided in the internal combustion engine. The engine gas passage and the intake passage are connected to each other by the intake manifold gas passage. The engine gas passage, the intake manifold gas passage and the intake passage are configured such that blowby gas flows from an inside of the engine gas passage into the intake passage through the intake manifold gas passage. The flow control valve is configured to control an amount of the blowby gas, and provided at a part in which the intake manifold gas passage and the engine gas passage are connected to each other. The lid is configured to open and close the communication hole. The communication hole is configured to connect an outside of the intake manifold to a part of the intake manifold gas passage. The part is located on a downstream side of the flow control valve in a gas flow direction. The communication hole opens the intake manifold gas passage to an atmosphere.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Herein below, a blowby gas treatment device and an intake manifold according to the first embodiment are explained.

Figure 1:
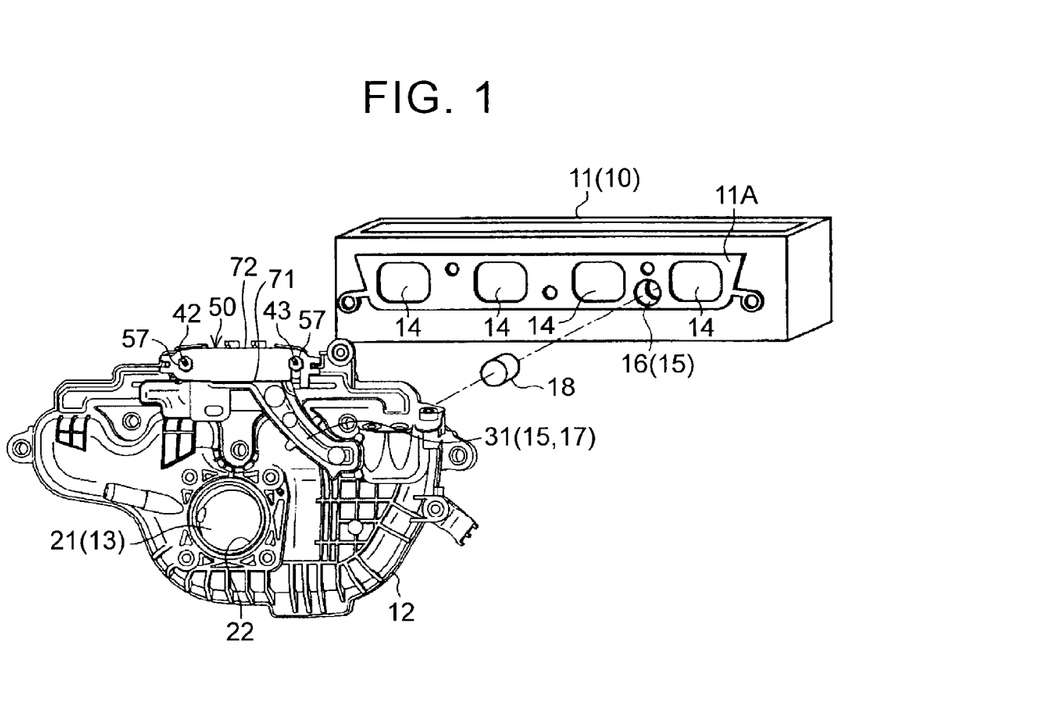
FIG. 1 is an exploded perspective view of rough structures of a blowby gas treatment device and an intake manifold according to the first embodiment.
Figure 2:
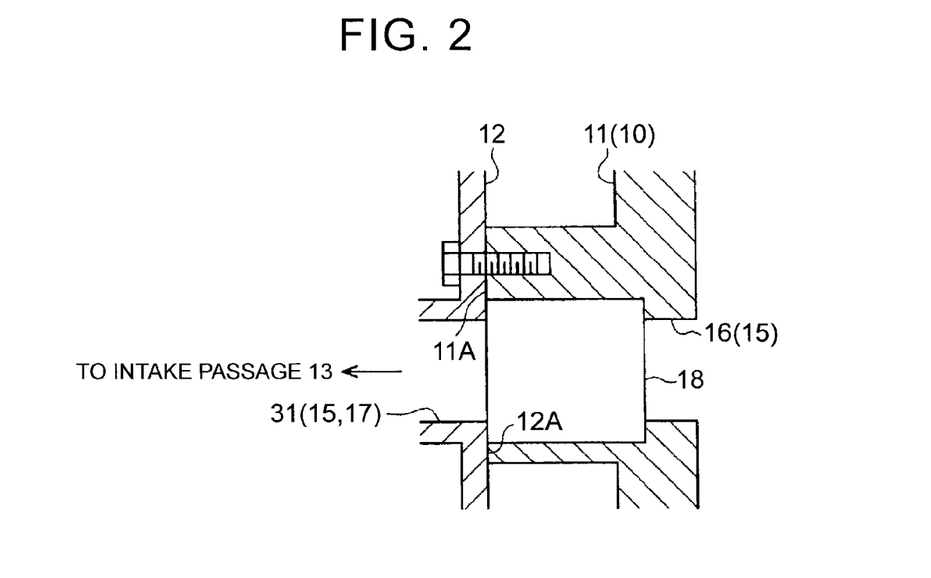
FIG. 2 is a sectional view of a sectional structure of a peripheral part of a PCV valve.

As shown in FIG. 1 and FIG. 2, an intake manifold 12 is mounted on a cylinder head 11 of an internal combustion engine 10. Inside the intake manifold 12, an intake passage 13 is formed, through which fluid, mainly inhaled air, passes. The intake passage 13 is connected with each intake port 14 formed in the cylinder head 11. The internal combustion engine 10 is an in-line four-cylinder engine.

In this embodiment, a passage, through which blowby gas passes, is structured from an engine gas passage 16 and an intake manifold gas passage 17. Blowby gas is discharged from inside of the cylinder head 11 to the intake passage 13 of the intake manifold 12. The engine gas passage 16 is formed in the cylinder head 11, and the intake manifold gas passage 17 is formed in the intake manifold 12. As shown in FIG. 2, an end part of the engine gas passage 16 on an upstream side in the gas flow direction, which is simply referred to as an upstream side below, is made to communicate with inside of the cylinder head 11. Then, and an end part of the engine gas passage 16 on a downstream side in the gas flow direction, which is simply referred to as a downstream side below, is open on a connecting surface 11A of the cylinder head 11 and the intake manifold 12. An end part of the intake manifold gas passage 17 on the upstream side is open on a connecting surface 12A of the cylinder head 11 and the intake manifold 12. An end part of the intake manifold gas passage 17 on the downstream side is made to communicate with the intake passage 13 of the intake manifold 12.

There is a connection part of the engine gas passage 16 and the intake manifold gas passage 17 between the cylinder head 11 and the intake manifold 12. In this connection part, a PCV valve 18 is provided. The PCV valve 18 is a flow control valve that controls a flow rate of blowby gas passing through the blowby gas passage 15. The PCV valve 18 is arranged in an end part of inside of the engine gas passage 16 on the connection part side. At normal time, the opening of the PCV valve 18 changes in accordance with pressure difference between the upstream side and the downstream side. To be in detail, the PCV valve 18 opens when internal pressure of the engine gas passage 16 is higher than internal pressure of the intake manifold gas passage 17. Opening of the PCV valve 18 decreases as internal pressure of the engine gas passage 16 becomes higher than internal pressure of the intake manifold gas passage 17. When the PCV valve 18 is open, blowby gas inside the cylinder head 11 flows into the intake passage 13 inside the intake manifold 12 through the blowby gas passage 15 that is made from the engine gas passage 16 and the intake manifold gas passage 17. Then, a flow rate of blowby gas passing through the blowby gas passage 15 is controlled in accordance with opening of the PCV valve 18. The blowby gas herein means gas that contains blowby gas, to be in detail.

Figure 3:
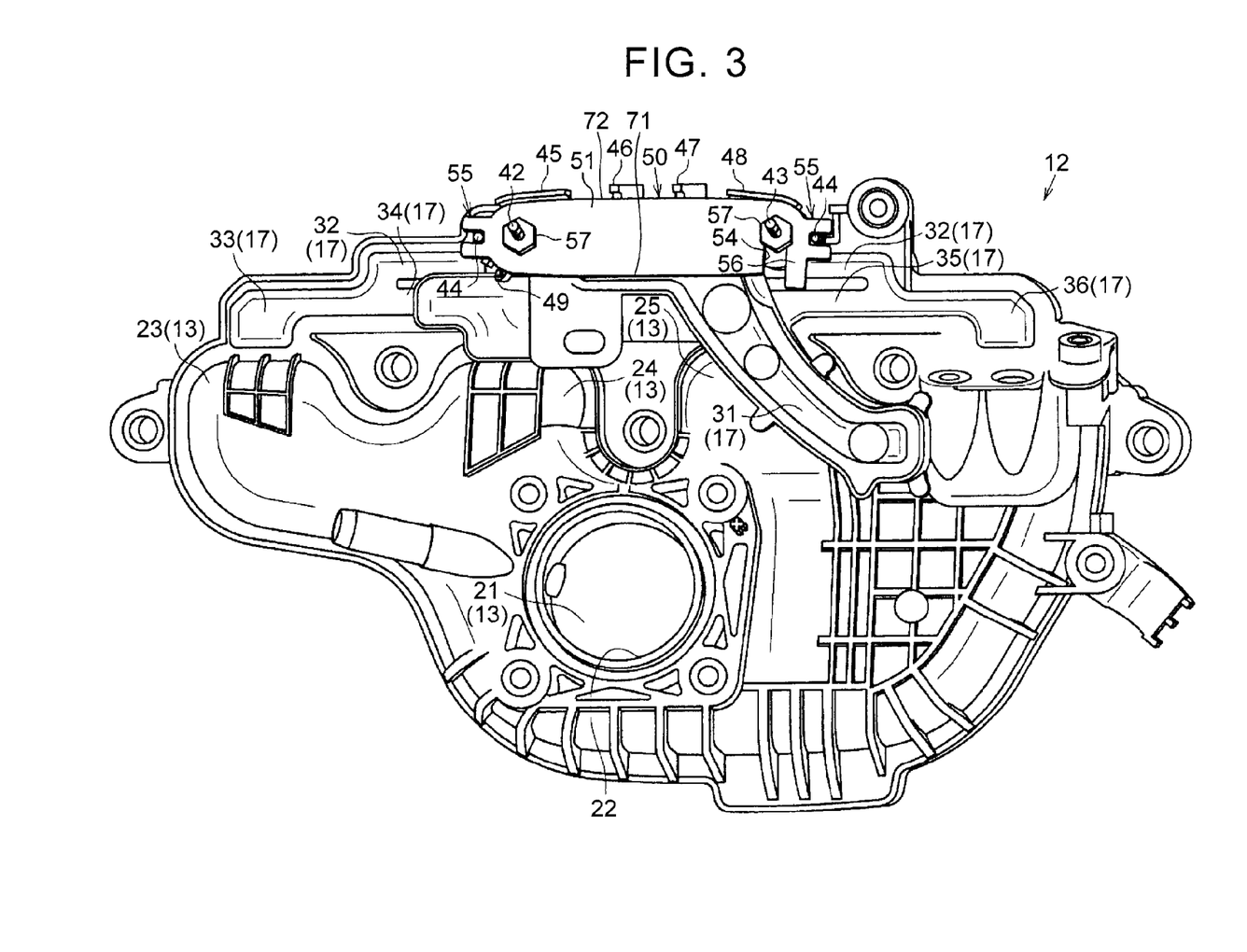
FIG. 3 is a perspective view of the intake manifold.
Figure 4:
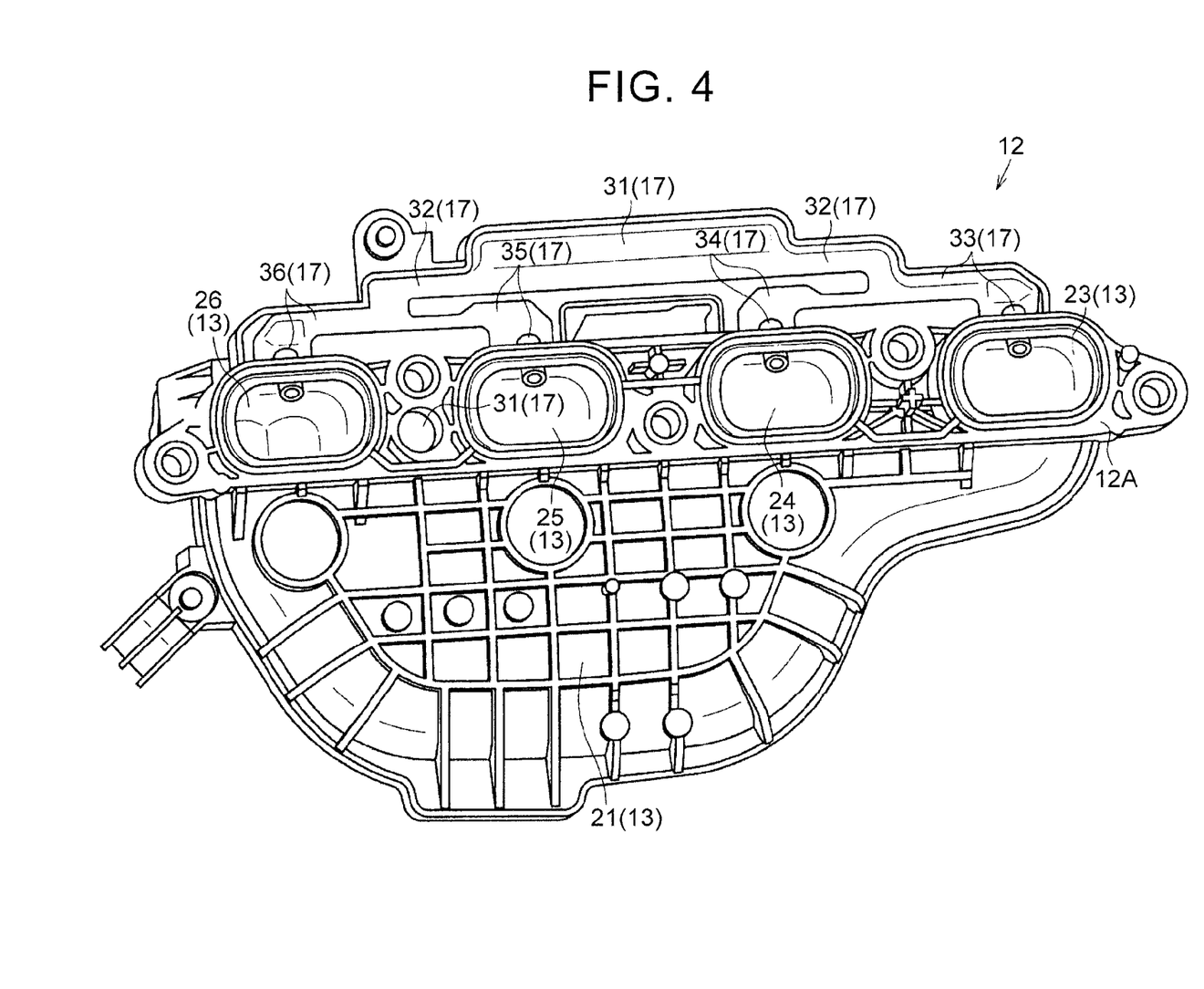
FIG. 4 is a perspective view of the intake manifold.

Next, a structure of the foregoing intake manifold 12 is explained in detail. As shown in FIG. 3 and FIG. 4, a volume part 21 working as a surge tank is formed inside the intake manifold 12. In the intake manifold 12, an intake introduction port 22 is formed, which allows outside of the intake manifold 12 and inside of the volume part 21 to communicate with each other. An intake pipe is connected with the intake introduction port 22. Inside the intake manifold 12, four branch passages are formed, which extend from the volume part 21 that serves as a starting point to the connecting surface 11A of the intake manifold 12. The four branch passages are a first intake branch passage 23, a second intake branch passage 24, a third intake branch passage 25, and a fourth intake branch passage 26. The first to fourth intake branch passages 23 to 26 are connected with intake ports 14 of the cylinders of the internal combustion engine 10 shown in FIG. 1, respectively. In the intake manifold 12, intake is flown into the volume part 21 through the intake introduction port 22. Then, the intake, which has flown in, is distributed to each of the intake ports 14 of the internal combustion engine 10 by the first to fourth intake branch passages 23 to 26.

To be in more detail, the foregoing intake manifold gas passage 17 has a common passage 31 extending from the connecting surface 11A of the intake manifold 12, which serves as a starting point. The common passage 31 is branched into two separate passages 32. One of the separate passages 32 is brunched into a first passage 33 and a second passage 34, and the other one is brunched into a third passage 35 and a fourth passage 36. An end edge of the first passage 33 is open inside the first intake branch passage 23. And end edge of the second passage 34 is open inside the second intake branch passage 24. An end edge of the third passage 35 is open inside the third intake branch passage 25. An end edge of the fourth passage 36 is open inside the fourth intake branch passage 26.

In this embodiment, blowby gas, which has flown into the intake manifold gas passage 17 through the engine gas passage 16 and the PCV valve 18 shown in FIG. 1, is distributed into each cylinder of the internal combustion engine 10 and discharged. To be in more detail, the blowby gas is distributed into the first to fourth intake branch passages 23 to 26 by the common passage 31, the separate passages 32, and the first to fourth passages 33 to 36. Thus, in this embodiment, blowby gas inside the cylinder head 11 of the internal combustion engine 10 shown in FIG. 1 is discharged to the intake passage 13 of the intake manifold 12 through the blowby gas passage 15, which is formed from the engine gas passage 16 and the intake manifold gas passage 17, and the PCV valve 18.

In this embodiment, while operation of the internal combustion engine 10 is stopped, operation check of the blowby gas treatment device is performed. When there is a pressure difference between the upstream side and the downstream side of the PCV valve 18, internal pressure of the part of the blowby gas passage 15 on the downstream side of the PCV valve 18 changes depending on the opening/closing state of the PCV valve 18. Based on this, in this embodiment, internal pressure of the intake manifold gas passage 17 is monitored under a condition that the PCV valve 18 opens when operating normally. Also, internal pressure of the intake manifold gas passage 17 is monitored under a condition that the PCV valve 18 closes when operating normally. Thus, it is determined whether or not the PCV valve 18 is operating normally.

Specifically, internal pressure of the intake manifold gas passage 17 is monitored while gas inside the intake manifold gas passage 17 is sucked. Then, it is determined whether or not the PCV valve 18 is opened properly. In this operation check, internal pressure of the intake manifold gas passage 17 is reduced due to the suction of gas. When the PCV valve 18 opens properly, pressure inside the cylinder head 11 is introduced into the intake manifold gas passage 17 through the engine gas passage 16. Therefore, pressure in the intake manifold gas passage 17 does not become so low. On the contrary, when the PCV valve 18 remains closed and does not open even though the internal pressure of the intake manifold gas passage 17 is reduced by the suction of gas, pressure inside the cylinder head 11 is not introduced into the intake manifold gas passage 17. Therefore, pressure in the intake manifold gas passage 17 is reduced greatly. By monitoring internal pressure of the intake manifold gas passage 17 as above, valve opening of the PCV valve 18 is checked.

In the operation check according to this embodiment, internal pressure of the intake manifold gas passage 17 is monitored while introducing gas into the intake manifold gas passage 17, thereby determining whether or not the PCV valve 18 is closed properly. When internal pressure of the intake manifold gas passage 17 increases due to the introduction of gas and the PCV valve 18 is closed properly, gas no longer flows out from the intake manifold gas passage 17 to the engine gas passage 16. Therefore, pressure in the intake manifold gas passage 17 becomes high. On the other hand, when the PCV valve 18 remains open and does not close even though internal pressure of the intake manifold gas passage 17 is increased due to the introduction of gas, gas flows out from the intake manifold gas passage 17 into the engine gas passage 16. Therefore, pressure in the intake manifold gas passage 17 does not become so high. By monitoring internal pressure of the intake manifold gas passage 17 as above, valve closing of the PCV valve 18 is checked.

By providing the communication hole 40, which allows outside of the intake manifold 12 and inside of the intake manifold gas passage 17 to communicate with each other, it is possible to connect operation check equipment with the communication hole 40. The operation check equipment is structured so as to monitor internal pressure of the intake manifold gas passage 17. This means that it becomes possible to perform operation check of the blowby gas treatment device using the operation check equipment connected with the communication hole 40. However, simply providing the communication hole 40 causes the intake manifold gas passage 17 to be opened to the atmosphere through the communication hole 40 while the internal combustion engine 10 is operating. Therefore, gas inside the intake manifold gas passage 17 is released to the atmosphere and the atmosphere is flown into the intake manifold gas passage 17, thereby causing the blowby gas treatment device to function improperly.

Based on this, in this embodiment, the intake manifold 12 is provided with the communication hole 40, which allows outside of the intake manifold 12 and inside of the intake manifold gas passage 17 to communicate with each other, as well as a lid 50 that is able to open and close the communication hole 40. Then, when operation check of the blowby gas treatment device is not performed, the lid 50 closes the communication hole 40. On the other hand, when operation check is performed, the lid 50 opens and the communication hole 40 and the intake manifold gas passage 17 are thus opened to the atmosphere.

Figure 5:
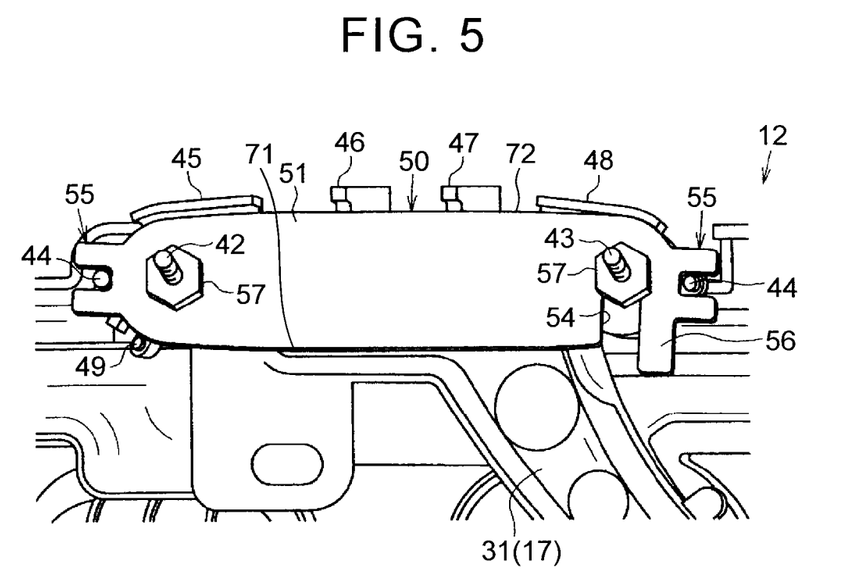
FIG. 5 is a perspective view of a peripheral part of a lid in the intake manifold.
Figure 7:
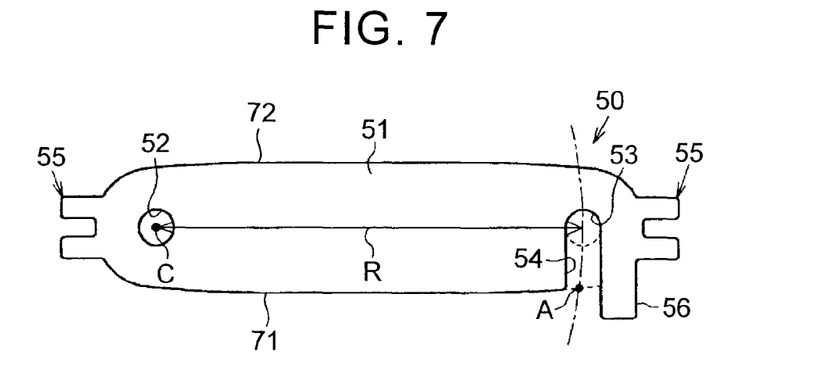
FIG. 7 is a side view of a side structure of the lid.

The lid 50 and the communication hole 40 are explained in detail below. As shown in FIG. 5 and FIG. 7, the lid 50 has a flat plate shape and includes a base part 51 having a generally oval shape. Two longs sides of the base part 51 are referred to as a first side 71 and a second side 72. A first through hole 52 is provided near one end of the base part 51 in a longitudinal direction. A second through hole 53 is provided near the other end. A slit 54 is also provided in the base part 51. The slit 54, having a long hole shape, extends from the second through hole 53 to the first side.

As shown in FIG. 7, a center of the first through hole 52 is set as a center C, and it is assumed that a circle is drawn, in which a distance R from the center of the first through hole 52 to the center of the second through hole 53 serves as its radius. The slit 54 is a long missing part extending on a raceway from the center of the second through hole 53 to the first side. To be more specific, the slit 54 extends linearly in a direction orthogonal to a straight line between the center of the first through hole 52 and the center of the second through hole 53.

As shown in FIG. 5 and FIG. 7, in the lid 50, engaging lugs 55 are provided in both end parts of the base part 51, respectively, in the longitudinal direction. The engaging lugs 55 have shapes extending in the direction connecting the center of the first through hole 52 and the center of the second through hole 53. Each of the engaging lugs 55 are structured from two projecting plates projecting in parallel to each other from the end part of the base part 51. In the lid 50, an interfering lug 56 is also provided in one of the end parts of the base part 51 in the longitudinal direction. The interfering lug 56 has a shape extending in the direction orthogonal to the straight line between the center of the first through hole 52 and the center of the second through hole 53.

Figure 6:
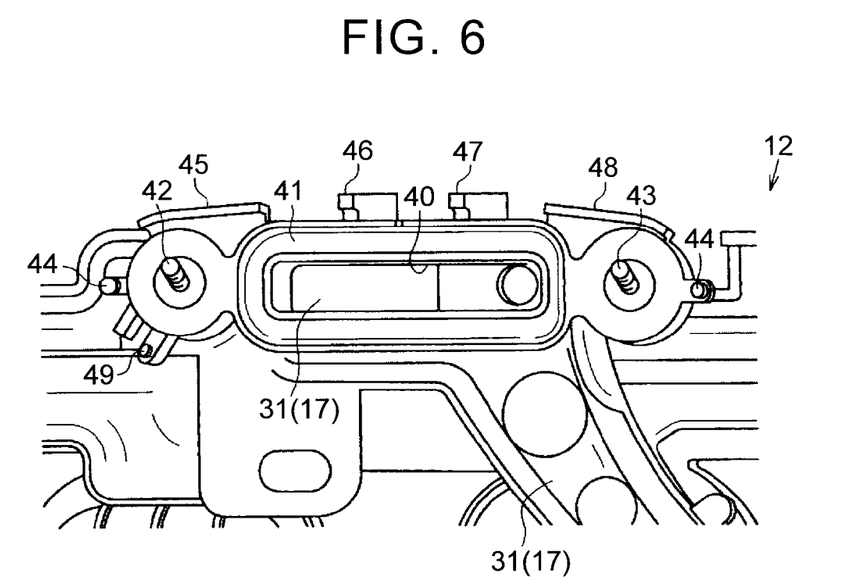
FIG. 6 is a perspective view of a communication hole in the intake manifold.

Further, as shown in FIG. 5 and FIG. 6, the intake manifold 12 has the communication hole 40 that allows outside of the intake manifold 12 and inside of the intake manifold gas passage 17, namely, the common passage 31, to communicate with each other. On a surface of the intake manifold 12, a gasket 41 having a shape extending around the entire circumference of the communication hole 40 is provided.

In the intake manifold 12, two external threads, which are a first external thread 42 and a second external thread 43, are erected at positions sandwiching the communication hole 40. When the lid 50 is mounted so as to close the communication hole 40, the first external thread 42 is inserted into the first through hole 52 of the lid 50, and the second external thread 43 is inserted into the second through hole 53 of the lid 50. Further, in the intake manifold 12, two columnar-shaped engaging projecting parts 44 are erected at positions sandwiching the first external thread 42 and the second external thread 43. When the lid 50 is mounted so as to close the communication hole 40, the two engaging projecting parts 44 are engaged with the two engaging lugs 55, respectively.

Further, in the intake manifold 12, four interfering projecting parts 45, 46, 47, 48 are provided with shapes projecting in the periphery of the communication hole 40. All of the interfering projecting parts 45 to 48 are formed into shapes that extend along one of end parts of the lid 50 in the transverse direction when the lid 50 is fixed in a state of closing the communication hole 40.

Figure 8:
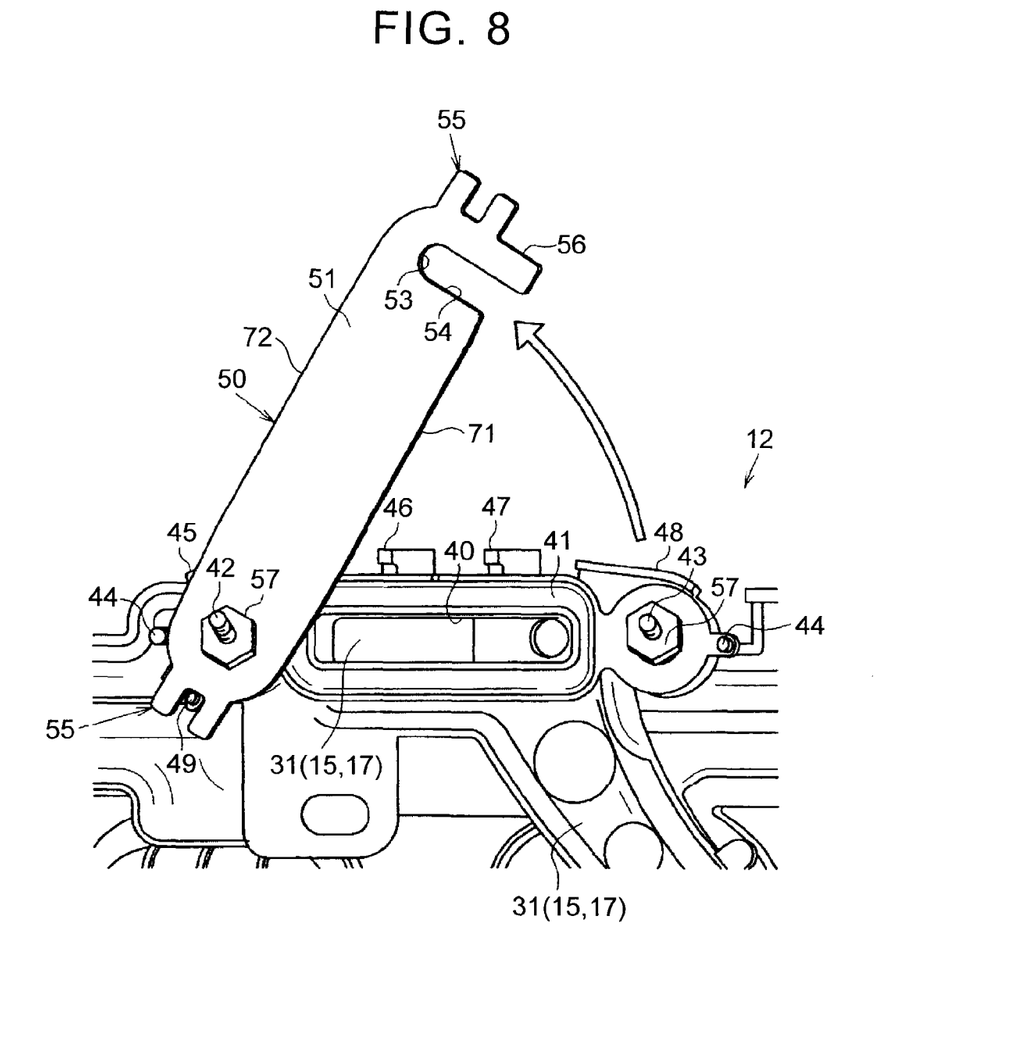
FIG. 8 is a perspective view of the peripheral part of the lid of the intake manifold in a state where the lid is open.

In the intake manifold 12, an engaging projecting part 49 projecting in a columnar shape is provided near the first external thread 42. FIG. 8 shows a state where the lid 50 is turned at a given angle about the first external thread 42 in a state where the first external thread 42 of the intake manifold 12 is inserted in the first through hole 52 of the lid 50. The engaging projecting part 49 is arranged at a position that allows one of the engaging lugs 55 of the lid 50 to be engaged with the engaging projecting part 49 when the lid 50 is in this state.

When the communication hole 40 is closed by the lid 50, the first external thread 42 is inserted into the first through hole 52 of the lid 50, and the second external thread 43 is inserted into the second through hole 53 of the lid 50. Nuts 57 are screwed into the first external thread 42 and the second external thread 43, respectively. Thus, the lid 50 is fastened to the intake manifold 12 in a state where the lid 50 is sandwiched between the nuts 57 and the intake manifold 12. Then, the communication hole 40 is closed by the lid 50. At this time, since the gasket 41 is held in a compressed state between the intake manifold 12 and the lid 50, a gap between the surface of the intake manifold 12 and the lid 50 is sealed by the gasket 41.

Effects obtained by providing the communication hole 40 and the lid 50 are explained below. In this embodiment, by using the first through hole 52 and the second through hole 53 of the lid 50, and the first external thread 42 and the second external thread 43 of the intake manifold 12, it is possible to fasten the lid 50 to the intake manifold 12 in the state where the communication hole 40 is closed by the lid 50. While the internal combustion engine 10 operates, the communication hole 40 is closed by the lid 50. Thus, the blowby gas passage 15 is not opened to the atmosphere. Because of this, the blowby gas treatment device functions properly.

When the lid 50 is fastened to the intake manifold 12 while closing the communication hole 40, the two engaging lugs 55 of the lid 50 and the two engaging projecting parts 44 of the intake manifold 12 are engaged with each other, respectively. Thus, the lid 50 is engaged while closing the communication hole 40, thereby making it possible to restrict the lid 50 from turning unnecessarily about the first through hole 52.

In this embodiment, the slit 54 extending from the second through hole 53 that serves as a starting point is formed in the lid 50. Therefore, when turning the lid 50 about the first through hole 52, it is possible to turn the lid 50 without hitting the second external thread 43. Therefore, by loosening the nut 57 fastened to the first external thread 42 and the nut 57 fastened to the second external thread 43, it is possible to turn the lid 50 about the first through hole 52 without removing the lid 50 from the intake manifold 12.

Figure 9:
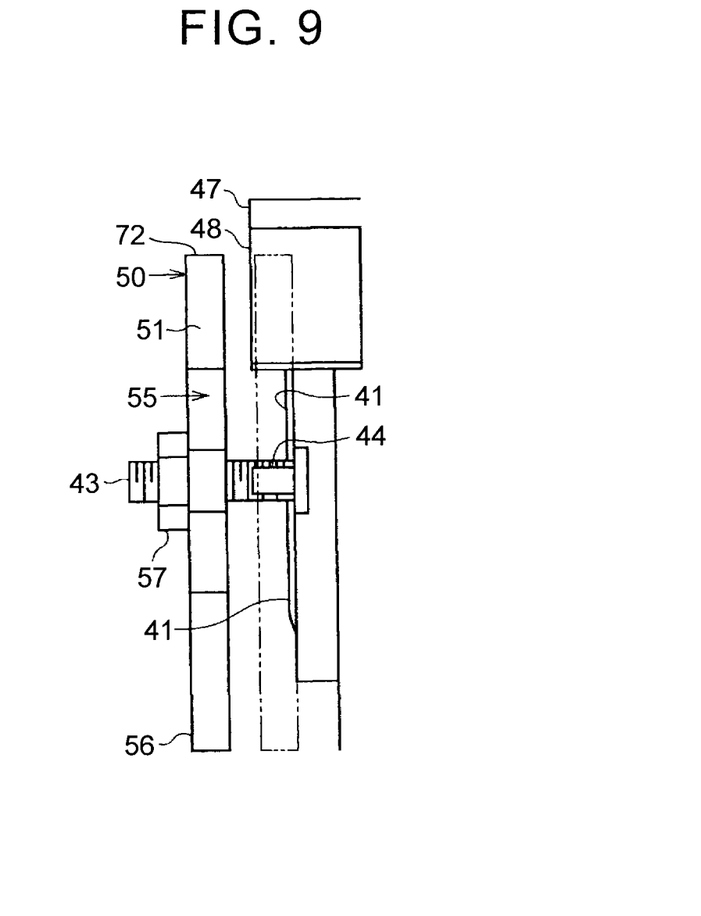
FIG. 9 is a side view of a side structure of the lid and its peripheral part while opening the lid.

However, in this embodiment, the interfering projecting parts 45 to 48 are provided in the intake manifold 12 in a projecting manner. Therefore, even if the lid 50 is attempted to be turned while the lid 50 is still at the position for closing the communication hole 40, the lid 50 hits the interfering projecting parts 45 to 48, and the lid 50 is restricted from turning. Therefore, as shown in FIG. 9, when turning the lid 50 in order to open the communication hole 40, it is necessary to move the lid 50 from the communication hole 40 first. This means that the lid 50 is moved from the position where the communication hole 40 is closed, to a position where the lid 50 does not hit the interfering projecting parts 45 to 48. Thus, it becomes possible to turn the lid 50 about the first through hole 52. Here, the position where the communication hole 40 is closed is the position shown by the alternate long and short dash line in FIG. 9. The position where the lid 50 does not hit the interfering projecting parts 45 to 48 is the position shown by a solid line in FIG. 9.

Since the above-mentioned interfering projecting parts 45 to 48 are provided, the lid 50 comes into contact with tips of the interfering projecting parts 45 to 48 when turning the lid 50. Therefore, a movement of the lid 50 in the direction towards the communication hole 40 is restricted. Thus, when the lid 50 is turned, it becomes possible to restrain the lid 50 from rubbing the gasket 41, and restrain the end part of the lid 50 from coming into contact with the gasket 41. Hence, it is possible to restrain the gasket 41 from being damaged.

As shown by the arrow in FIG. 8, by turning the lid 50 about the first through hole 52, it is possible to open the communication hole 40 to outside of the intake manifold 12.

In this embodiment, the lid 50 and the intake manifold 12 have such structures that enable one of the engaging lugs 55 and the engaging projecting part 49 to be engaged with each other when the lid 50 is turned to a given turning position in order to open the communication hole 40. By allowing one of the engaging lugs 55 of the lid 50 and the engaging projecting part 49 of the intake manifold 12 to be engaged with each other, turning of the lid 50 about the first through hole 52 is restricted. In this way, the lid 50 is structured so as to be locked in the state where the communication hole 40 is open. Due to this structure, it is not necessary to hold the lid 50 with a hand when connecting the operation check equipment with the communication hole 40, thereby making connection of the operation check equipment done easily.

According to this embodiment, it is possible to close the communication hole 40 with the lid 50 or open the communication hole 40 to outside of the intake manifold 12 without removing the lid 50 from the intake manifold 12.

When performing operation check of the blowby gas treatment device, it is possible to open the intake manifold gas passage 17 to outside of the intake manifold 12 through the communication hole 40 by opening the lid 50. Thus, it is possible to connect the operation check equipment with the communication hole 40. The operation check equipment is equipment that is able to suck in gas inside the intake manifold gas passage 17 and introduce the gas into the intake manifold gas passage 17. Further, the operation check equipment includes equipment for measuring internal pressure of the intake manifold gas passage 17.

As stated above, according to this embodiment, the blowby gas passage 15, namely, the engine gas passage 16 and the intake manifold gas passage 17 are formed integrally with the intake manifold 12 and the cylinder head 11. However, by opening the lid 50 and connecting the operation check equipment with the communication hole 40, it is possible to monitor internal pressure of the intake manifold gas passage 17 easily. Thus, it becomes possible to perform operation check of the blowby gas treatment device easily.

In this embodiment, when the lid 50 is attempted to be mounted on the intake manifold 12 in a wrong mounting condition, the interfering lug 56 of the lid 50 hits the interfering projecting parts 45, 48 and the engaging projecting part 49 of the intake manifold 12 in the mounting process, thereby restricting mounting of the lid 50.

Specifically, when the lid 50 is inside out in a state where the first external thread 42 of the intake manifold 12 is inserted into the first through hole 52 of the lid 50, and the second external thread 43 is inserted into the second through hole 53 of the lid 50, the interfering lug 56 of the lid 50 hits the interfering projecting part 48. Meanwhile, even though the lid 50 is not inside out, when the second external thread 43 is incorrectly inserted into the first through hole 52 and the first external thread 42 is incorrectly inserted into the second through hole 53, the interfering lug 56 of the lid 50 hits the interfering projecting part 45. Further, when the second external thread 43 is incorrectly inserted into the first through hole 52 and the first external thread 42 is incorrectly inserted into the second through hole 53, and further, the lid 50 is inside out, the interfering lug 56 of the lid 50 hits the engaging projecting part 49.

On the contrary, when the lid 50 is mounted in a correct mounting condition as shown in FIG. 5, the interfering lug 56 of the lid 50 does not hit the interfering projecting parts 45, 48 and the engaging projecting part 49 of the intake manifold 12. Therefore, in this embodiment, it is possible to prevent the lid 50 from being mounted incorrectly.

As explained so far, according to this embodiment, the effects stated below are obtained. The intake manifold 12 is provided with the communication hole 40 that allows outside of the intake manifold 12 and the intake manifold gas passage 17 to communicate with each other so that the intake manifold gas passage 17 is opened to the atmosphere. Further, the lid 50 is provided in the intake manifold 12 so as to be able to open and close the communication hole 40. Therefore, even though the blowby gas passage 15 is formed integrally with the intake manifold 12 and the cylinder head 11, it is possible to perform operation check of the blowby gas treatment device easily.

The base part 51 of the lid 50 is provided with the slit 54 having the long hole shape extending from the second through hole 53 to the end of the base part 51, namely, the first side. The slit 54 has a shape that extends to an intersection point A where the circle intersects with the end of the lid 50. The circle is formed around the first through hole 52 serving as the center C, and the distance R from the first through hole 52 to the second through hole 53 serves as its radius. When closing the communication hole 40 with the lid 50, the first external thread 42 is first inserted into the first through hole 52, the second external thread 43 is inserted into the second through hole 53. Then, by screwing the nuts 57 into the first external thread 42 and the second external thread 43, respectively, the lid 50 is fastened to the intake manifold 12. Therefore, it is possible to close the communication hole 40 and open the communication hole 40 to outside of the intake manifold 12 without removing the lid 50 from the intake manifold 12.

As the PCV valve 18, a valve is used, in which opening changes depending on a pressure difference between the upstream side and the downstream side at normal time. Therefore, it is possible to determine whether or not the PCV valve 18 operates normally by monitoring internal pressure of the intake manifold gas passage 17 under the condition where the PCV valve 18 opens when the PCV valve 18 operates normally, and under the condition where the PCV valve 18 closes when the PCV valve 18 operates normally.

Herein below, a blowby gas treatment device and an intake manifold according to the second embodiment are explained mainly regarding a difference from the first embodiment.

In the blowby gas treatment device and the intake manifold according to this embodiment, only an arrangement position of a PCV valve 18 is different from that of the blowby gas treatment device and the intake manifold according to the first embodiment. An arrangement mode for the PCV valve 18 is explained below.

Figure 10:
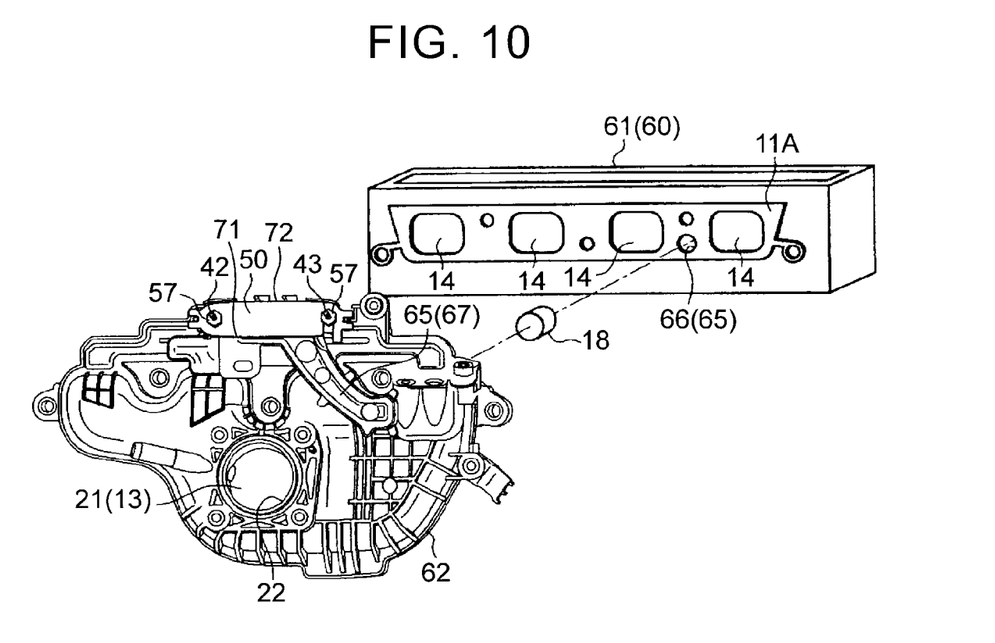
FIG. 10 is an exploded perspective view of rough structures of a blowby gas treatment device and an intake manifold according to the second embodiment.
Figure 11:
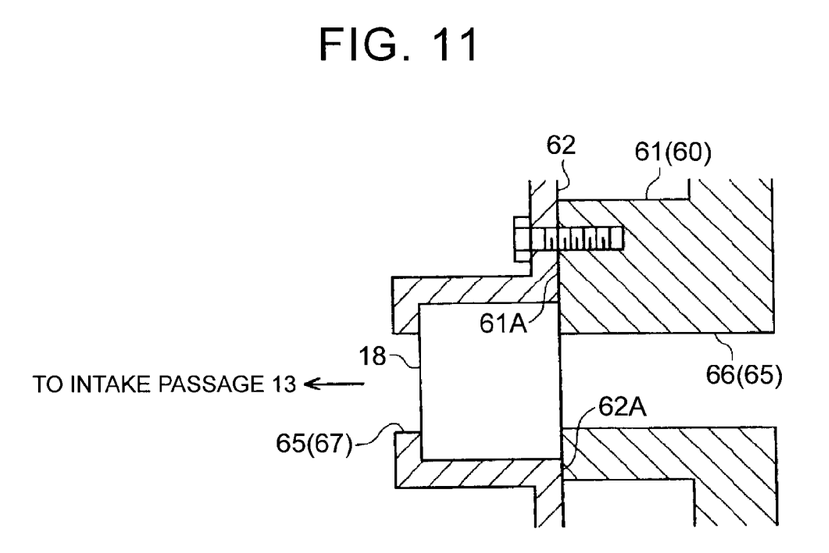
FIG. 11 is a sectional view of a sectional structure of a peripheral part of a PCV valve according to the second embodiment.

FIG. 10 shows rough structures of the blowby gas treatment device and the intake manifold according to this embodiment. FIG. 11 shows a sectional structure of a peripheral part of a PCV valve in the blowby gas treatment device. In FIG. 10 and FIG. 11, equivalent parts to those in the first embodiment are designated by the same reference numerals, and detailed explanation of those parts is omitted.

As shown in FIG. 10 and FIG. 11, a blowby gas passage 65 is structured from an engine gas passage 66 formed integrally with a cylinder head 61, and an intake manifold gas passage 67 formed integrally with an intake manifold 62. The blowby gas passage 65 is a passage through which blowby gas is discharged to an intake passage 13 of the intake manifold 62 from inside of the cylinder head 61 of an internal combustion engine 60.

As shown in FIG. 11, an end part of the engine gas passage 66 on an upstream side communicates with inside of the cylinder head 61. An end part of the engine gas passage 66 on a downstream side is open on a connecting surface 61A of the cylinder head 61 and the intake manifold 62. An end part of the intake manifold gas passage 67 on the upstream side is open on a connecting surface 62A of the cylinder head 61 and the intake manifold 62. An end part of the intake manifold gas passage 67 on the downstream side communicates with the intake passage 13 of the intake manifold 62.

A PCV valve 18 is provided in a connection part of the engine gas passage 66 and the intake manifold gas passage 67 between the cylinder head 61 and the intake manifold 62. The PCV valve 18 controls a flow rate of blowby gas that passes through the blowby gas passage 65. The PCV valve 18 is arranged in an end part of inside of the intake manifold gas passage 67 on the connection part side.

According to this embodiment, effects stated below are obtained. The intake manifold 62 is provided with a communication hole 40 that allows the outside of the intake manifold 62 and the intake manifold gas passage 67 to communicate with each other, thereby opening the intake manifold gas passage 67 to the atmosphere. Also, a lid 50 structured so as to be able to open and close the communication hole 40 is provided in the intake manifold 62. Therefore, although the intake manifold gas passage 67 is provided integrally with the intake manifold 62, it is possible to connect operation check equipment with the communication hole 40 by opening the lid 50. It is thus possible to monitor internal pressure of the intake manifold gas passage 67 easily. This means that operation check of the PCV valve 18 is performed easily.

A base part 51 of the lid 50 is provided with a slit 54 that extends from a second through hole 53 to an end of the base part 51. it is assumed that a circle is drawn, in which a center of a first through hole 52 is set as a center C, and a distance R from the center of the first through hole 52 to a center of the second through hole 53 serves as its radius. In this case, the slit 54 has a shape extending to an intersection point A in which the raceway of the circle intersects with a first side of the lid 50. Then, when closing the communication hole 40 with the lid 50, a first external thread 42 is inserted into a first through hole 52 of the lid 50, and a second external thread 43 is inserted into a second through hole 53 of the lid 50. As nuts 57 are screwed into the first external thread 42 and the second external thread 43, respectively, the lid 50 is fastened to the intake manifold 62. Therefore, it is possible to use the lid 50 to close the communication hole 40 or open the communication hole 40 to outside of the intake manifold 62 without removing the lid 50 from the intake manifold 62.

As the PCV valve 18, a valve is used, in which opening changes depending on a pressure difference between the upstream side and the downstream side at normal time. Therefore, it is possible to determine whether or not the PCV valve 18 operates normally by monitoring internal pressure of the intake manifold gas passage 67 under a condition where the PCV valve 18 opens when the PCV valve 18 operates normally, and under a condition where the PCV valve 18 closes when the PCV valve 18 operates normally.

The foregoing embodiments may be changed as below and carried out. In each of the foregoing embodiments, a mode for performing operation check of the blowby gas treatment device may be changed arbitrarily as long as it is possible to determine accurately whether or not abnormality has happened based on internal pressure of the intake manifold gas passages 17, 67. To be specific, as the operation check equipment, it is possible to use equipment that measures internal pressure of the intake manifold gas passages 17, 67. The operation check equipment is able to perform operation check of the blowby gas treatment device based on a relationship between internal pressure of the intake manifold gas passages 17, 67 measured by the operation check equipment during operation of the internal combustion engine 10 and an operation state of the PCV valve 18 understood from an engine operating condition.

In the blowby gas treatment device, the intake manifold gas passages 17, 67 are connected with the intake passages 13 of the intake manifolds 12, 62. Therefore, when the PCV valve 18 is closed during operation of the internal combustion engines 10, 60 intake negative pressure is introduced into the intake manifold gas passages 17, 67. Then, internal pressure of the intake manifold gas passages 17, 67 becomes low. On the other hand, when the PCV valve 18 is open during operation of the internal combustion engine 10, pressure inside the cylinder heads 11, 61 is introduced from the engine gas passages 16, 66 into the intake manifold gas passages 17, 67. Therefore, internal pressure of the intake manifold gas passages 17, 67 does not become so low. According to the above-described device, by monitoring internal pressure of the intake manifold gas passages 17, 67, it is possible to check valve closing of the PCV valve 18. The blowby gas treatment device, to which the above-mentioned mode for performing the operation check is applied, is also applicable to a device in which an electromagnetic control valve is provided as a PCV valve that is operated based on a command signal in accordance with an operating state of the internal combustion engines 10, 60.

In each of the embodiments, it is possible to omit each of the interfering projecting parts 45 to 48 in the intake manifolds 12, 62. In each of the embodiments, each of the engaging projecting parts 44, 49 of the intake manifolds 12, 62 may also be omitted. In this case, each of the engaging lugs 55 of the lid 50 may be omitted.

In each of the embodiments, it is possible to omit the interfering lug 56 of the lid 50. In the first embodiment, the PCV valve 18 is provided in the end part of inside of the engine gas passage 16 on the side of the connection part of the engine gas passage 16 and the intake manifold gas passage 17. Then, the communication hole 40 is provided, which allows the part of the intake manifold gas passage 17 on the downstream side of the PCV valve 18 and outside of the intake manifold 12 to communicate with each other. In the second embodiment, the PCV valve 18 is provided in the end part of inside of the intake manifold gas passage 67 on the side of the connection part of the intake manifold gas passage 67 and the engine gas passage 66. Then, the communication hole 40 is provided, which allows the part of the intake manifold gas passage 67 on the downstream side of the PCV valve 18 and outside of the intake manifold 62 to communicate with each other. This means that, as long as the communication hole 40 is provided, which allows the parts of the intake manifold gas passages 17, 67 on the downstream side of the PCV valve 18 and outside of the intake manifolds 12, 62 to communicate with each other, it is possible to perform operation check of the blowby gas treatment device even if the blowby gas passages 15, 65 are formed integrally with the internal combustion engines 10, 60 and the intake manifolds 12, 62. Therefore, the arrangement position of the PCV valve 18 may be changed arbitrarily as long as the communication hole 40 is formed at the position that allows the parts of the intake manifold gas passages 17, 67 on the downstream side of the PCV valve 18 and outside of the intake manifolds 12, 62 to communicate with each other. For example, it is possible to provide the PCV valve 18 on the way of the intake manifold gas passages 17, 67, or on the way of the engine gas passages 16, 66.

In each of the embodiments, the lid for opening and closing the communication hole 40 may be structured so as to be removed from the intake manifold 12 when performing operation check of the blowby gas treatment device.

The blowby gas treatment device and the intake manifold according to each of the embodiments may be applied to an internal combustion engine with one to three cylinders or an internal combustion engine with five cylinders or more.

What is claimed is:

1. A blowby gas treatment device comprising:
    an internal combustion engine including an engine gas passage,
    the engine gas passage being integral with the internal combustion engine;
    an intake manifold including an intake passage, an intake manifold gas passage, and a communication hole, the intake manifold gas passage being integral with the intake manifold;
    a blowby gas passage being configured to connect an inside of the internal combustion engine to the intake passage, the blowby gas passage being configured such that blowby gas passes through the blowby gas passage;
    a flow control valve provided in the blowby gas passage, the flow control valve being configured to adjust an amount of the blowby gas; and
    a lid configured to open and close the communication hole,
    the communication hole being configured to connect an outside of the intake manifold to a part of the intake manifold gas passage, the part being located on a downstream side of the flow control valve in a gas flow direction, and the communication hole opening the intake manifold gas passage to an atmosphere, wherein
    the lid includes a first side, a first through hole, and a slit,
    in which the slit includes a second through hole, and the first side is one of long sides of the lid,
    the first through hole and the second through hole are provided at a given distance from each other,
    the slit extends to the first side from the second through hole,
    the slit extends to an intersection point at which a raceway of a circumference of a circle and the first side intersect with each other, when the circle is drawn in which the distance from the first through hole to the second through hole serves as a radius, and
    the lid is configured to be fastened to the intake manifold by a first external thread inserted into the first through hole and a second external thread inserted into the second through hole when closing the communication hole.

2. The blowby gas treatment device according to claim 1, wherein
    the flow control valve is configured such that opening of the flow control valve changes in accordance with a pressure difference in the engine gas passage and in the intake passage at normal time of the flow control valve.

3. An intake manifold comprising:
    an intake passage configured to allow fluid to pass through towards an intake port of an internal combustion engine;
    a blowby gas passage configured to allow blowby gas to pass through, a flow rate of the blowby gas is controlled by a flow control valve, the blowby gas passage including an engine gas passage and an intake manifold gas passage, the engine gas passage being formed integrally with the internal combustion engine;
    a communication hole that allows a part of the intake manifold gas passage on a downstream side of the flow control valve in a gas flow direction to communicate with outside, the communication hole opening the intake manifold gas passage to an atmosphere; and
    a lid configured to open and close the communication hole, wherein
    the lid includes a first through hole, a slit, and a first side,
    the slit includes a second through hole,
    the first through hole and the second through hole are provided at a distance from each other,
    the slit extends to the first side from the second through hole,
    the slit extends to an intersection point at which a raceway of a circumference of a circle and the first side intersect with each other, when the circle is drawn in which the distance from the first through hole to the second through hole serves as a radius, and
    the lid is configured to be fastened to the intake manifold by a first external thread inserted into the first through hole and a second external thread inserted into the second through hole when closing the communication hole.

4. An internal combustion engine comprising:
    an intake manifold including an intake passage, intake manifold gas passage, and a communication hole;
    an engine gas passage provided in the internal combustion engine, the engine gas passage and the intake passage being connected to each other by the intake manifold gas passage, the engine gas passage, the intake manifold gas passage and the intake passage being configured such that blowby gas flows from an inside of the engine gas passage into the intake passage through the intake manifold gas passage,
    a flow control valve being configured to control an amount of the blowby gas, the flow control valve being provided at a part in which the intake manifold gas passage and the engine gas passage are connected to each other; and
    a lid configured to open and close the communication hole,
    the communication hole being configured to connect an outside of the intake manifold to a part of the intake manifold gas passage, the part being located on a downstream side of the flow control valve in a gas flow direction,
    the communication hole opening the intake manifold gas passage to an atmosphere, wherein
    the lid includes a first side, a first through hole, and a slit,
    in which the slit includes a second through hole, and the first side is one of long sides of the lid,
    the first through hole and the second through hole are provided at a given distance from each other,
    the slit extends to the first side from the second through hole,
    the slit extends to an intersection point at which a raceway of a circumference of a circle and the first side intersect with each other, when the circle is drawn in which the distance from the first through hole to the second through hole serves as a radius, and the lid is configured to be fastened to the intake manifold by a first external thread inserted into the first through hole and a second external thread inserted into the second through hole when closing the communication hole.

* * * * *

UNITED STATES PATENT AND TRADEMARK OFFICE
CERTIFICATE OF CORRECTION

PATENT NO. : 9,920,720 B2
APPLICATION NO. : 15/040626
DATED : March 20, 2018
INVENTOR(S) : Yukio Iwazume et al.

Page 1 of 1

It is certified that error appears in the above-identified patent and that said Letters Patent is hereby corrected as shown below:

On the Title Page

Item (71) the Applicant's information is incorrect. Item (71) should read:
--(71) Applicant: AISIN SEIKI KABUSHIKI KAISHA, Kariya-shi (JP)--

Signed and Sealed this
Second Day of April, 2019

Andrei Iancu
*Director of the United States Patent and Trademark Office*